US008772425B2

(12) United States Patent
Determan et al.

(10) Patent No.: US 8,772,425 B2
(45) Date of Patent: *Jul. 8, 2014

(54) HIGH REFRACTIVE INDEX PRESSURE-SENSITIVE ADHESIVES

(71) Applicant: 3M Innovative Properties Company, St. Paul, MN (US)

(72) Inventors: Michael D. Determan, Mahtomedi, MN (US); Albert I. Evaraerts, Oakdale, MN (US); Cheryl L. Moore, Afton, MN (US); David B. Olson, Marine on St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,022

(22) Filed: Jan. 15, 2013

(65) Prior Publication Data

US 2013/0196149 A1    Aug. 1, 2013

Related U.S. Application Data

(63) Continuation of application No. 12/608,019, filed on Oct. 29, 2009, now Pat. No. 8,378,046, which is a continuation-in-part of application No. 11/875,194, filed on Oct. 19, 2007, now abandoned.

(51) Int. Cl.
| | |
|---|---|
| *C08F 220/38* | (2006.01) |
| *C08F 220/30* | (2006.01) |
| *C08F 220/56* | (2006.01) |
| *C09J 133/08* | (2006.01) |
| *C09J 7/02* | (2006.01) |
| *C09J 133/14* | (2006.01) |

(52) U.S. Cl.
CPC .......... *C09J 7/0217* (2013.01); *C09J 2201/606* (2013.01); *C09J 133/14* (2013.01); *C09J 133/08* (2013.01)
USPC ........... 526/286; 526/311; 526/320; 526/326; 428/355 AC

(58) Field of Classification Search
USPC ............ 526/286, 311, 320, 326; 428/355 AC
See application file for complete search history.

(56) References Cited

U.S. PATENT DOCUMENTS

| | | | |
|---|---|---|---|
| 3,691,140 A | 9/1972 | Silver | |
| 4,166,152 A | 8/1979 | Baker et al. | |
| 4,419,481 A * | 12/1983 | Schwartz | ...................... 524/551 |
| 4,518,756 A | 5/1985 | Yoshida et al. | |
| 4,619,979 A | 10/1986 | Kotnour et al. | |
| 4,636,432 A | 1/1987 | Shibano et al. | |
| 4,656,218 A | 4/1987 | Kinoshita | |
| 4,737,559 A | 4/1988 | Kellen et al. | |
| 4,843,134 A | 6/1989 | Kotnour et al. | |
| 5,045,569 A | 9/1991 | Delgado | |
| 5,110,971 A | 5/1992 | Haus | |
| 5,132,430 A | 7/1992 | Gaudiana et al. | |
| 5,183,870 A | 2/1993 | Fukushima et al. | |
| 5,290,892 A | 3/1994 | Namdaran et al. | |
| 5,453,452 A | 9/1995 | Nakayama et al. | |
| 5,629,445 A | 5/1997 | Nakayama et al. | |
| 5,637,646 A | 6/1997 | Ellis | |
| 5,804,610 A | 9/1998 | Hamer et al. | |
| 5,885,709 A | 3/1999 | Wick | |
| 5,905,099 A * | 5/1999 | Everaerts et al. | ............. 522/126 |
| 6,667,095 B2 | 12/2003 | Wheatley et al. | |
| 6,703,463 B2 | 3/2004 | Holguin et al. | |
| 6,773,804 B2 | 8/2004 | Enlow et al. | |
| 6,842,288 B1 | 1/2005 | Liu et al. | |
| 6,852,820 B2 | 2/2005 | Mentak | |
| 6,893,718 B2 | 5/2005 | Melancon et al. | |
| 7,144,928 B2 | 12/2006 | Husemann et al. | |
| 7,166,686 B2 | 1/2007 | Olson et al. | |
| 7,449,223 B2 | 11/2008 | Kawamura et al. | |
| 2004/0010088 A1 | 1/2004 | Husemann et al. | |
| 2004/0091729 A1 | 5/2004 | Olson et al. | |
| 2005/0009995 A1 | 1/2005 | Husemann et al. | |
| 2005/0020714 A1 | 1/2005 | Husemann et al. | |
| 2006/0128853 A1 | 6/2006 | Olson | |
| 2007/0110941 A1 | 5/2007 | Utesch et al. | |
| 2008/0071044 A1 | 3/2008 | Keite-Telgenbuscher et al. | |
| 2008/0221291 A1 | 9/2008 | Invie et al. | |
| 2008/2866485 | 11/2008 | Zollner | |
| 2009/0270557 A1 | 10/2009 | Tomita | |

FOREIGN PATENT DOCUMENTS

| | | |
|---|---|---|
| EP | 0 126 397 | 11/1984 |
| EP | 1 244 756 | 10/2002 |
| EP | 1 903 084 | 3/2008 |
| EP | 1 956 064 | 8/2008 |
| JP | 61-127704 | 6/1986 |
| JP | 7-316245 | 12/1995 |
| JP | 9-272707 | 10/1997 |
| JP | 3397448 | 4/2003 |
| JP | 2004/323557 | 11/2004 |

(Continued)

OTHER PUBLICATIONS

Ciba (Ciba Tinuvin 328: Light Stabilizer. Ciba Specialty Chemicals. 1997. 3 pages).*
PCT International Search Report, PCT US2008/079865.
Petrie, Edward, "Adhesive Composition and Formulation," Handbook of Adhesives and Sealants, Chapter 9, pp. iii-iv and pp. 319-323, 2000.
Kim, et al., "Rapid replication of polymeric and metallic high aspect ratio microstructures using PDMS and LIGA technology," Microsystem Technologies Springer-Verlag Germany, vol. 9, No. 1-2, Nov. 2002, pp. 5-10.
Francisco, et al., "Fabrication of Metallic Heat Exchangers Using Sacrificial Polymer Mandrills," Journal of Microelectromechanical Systems, vol. 10, No. 1, Mar. 1, 2001, pp. 107-112.
ASTM D 1003-07, "Standard Test Method for Haze and Luminous Transmittance of Transparent Plastics", pp. 1-7, ASTM Int'l.
ASTM D 3330-76, "Standard Test Methods for Peel Adhesion of Pressure-Sensitive Tape at 180-Deg Angle", pp. 661-664.

(Continued)

*Primary Examiner* — Brieann R Fink
(74) *Attorney, Agent, or Firm* — Jeffrey M. Olofson

(57) ABSTRACT

The present invention provides pressure-sensitive adhesives having a refractive index of at least 1.50. The pressure-sensitive adhesives comprise at least one monomer containing a substituted or an unsubstituted biphenyl group.

12 Claims, No Drawings

(56) References Cited

FOREIGN PATENT DOCUMENTS

| JP | 2005/272773 | 10/2005 |
| JP | 2006/016599 | 1/2006 |
| WO | WO 02/072189 | 9/2002 |
| WO | WO 03/046031 | 6/2003 |
| WO | WO 2005/068575 | 7/2005 |
| WO | WO 2007/058277 A1 | 5/2007 |

OTHER PUBLICATIONS

ASTM D 3654-78, "Standard Test Method for Holding Power of Pressure-Sensitive Tapes", pp. 725-727, American National Standard.

PSTC-1, "Peel Adhesion for Single Coated Tapes 180° Angle", p. 22.

PSTC-7, "Shear Adhesion (holding power)", p. 30.

Bass et al., "Handbook of Optics", (1995), vol. I & II, $2^{nd}$ Edition, McGraw-Hill, Inc. New York.

Satas, "Handbook of Pressure Sensitive Adhesive Technology", (1989), pp. 172 and 399, $2^{nd}$ Edition, Van Nostrand Reinhold, New York.

Satas, "Handbook of Pressure-Sensitive Adhesive Technology", (1982), Van Nostrand Reinhold Company, New York.

Wypych, "Handbook of Plasticizers", (2004), 18 pgs., ChemTec Publishing, Toronto, Ontario, Canada.

\* cited by examiner

HIGH REFRACTIVE INDEX PRESSURE-SENSITIVE ADHESIVES

FIELD OF INVENTION

This invention relates to pressure-sensitive and heat-activated adhesives. More particularly, this invention relates to adhesives having a high refractive index.

BACKGROUND OF THE INVENTION

Pressure-sensitive adhesives ("PSAs") are defined herein as adhesives which exhibit permanent tack at room temperature. This property allows pressure-sensitive adhesives to adhere tenaciously upon application with only light finger pressure. PSAs have a balance of properties: adhesion, cohesion, stretchiness, and elasticity. Adhesion refers both to immediate adhesion to a surface and to the bond strength which develops upon application of pressure (often measured as "peel strength"). Cohesion refers to the "shear strength" or resistance of the applied PSA to failure when subjected to shearing forces. Stretchiness refers to the ability to elongate under low stresses. Elasticity refers to a property wherein the material exhibits a retractive force when stretched and retracts when the force is released.

Heat-activated adhesives ("HAs") are defined herein as adhesives that are non-tacky at room temperature but become temporarily tacky and are capable of bonding to a substrate at elevated temperatures. At or above this activation temperature, they have the same characteristics as PSAs, i.e. adhesion, cohesion, stretchiness, and elasticity. These adhesives usually have a $T_g$ or melting point ($T_m$) above room temperature. When the temperature is elevated above the $T_g$ or $T_m$, the storage modulus usually decreases and the adhesive become tacky.

Pressure-sensitive and heat-activated adhesives have many diverse applications including applications in optical products. For certain optical applications, it is useful to match the refractive index (RI) of the adhesive to that of the substrate to which it is applied. This matching of refractive index enhances the optical properties of the construction by reducing glare and reflectance. Glare is defined herein as the average reflectance over a range of 450-650 nanometers and reflectance is defined herein as the process where a fraction of the radiant flux incident on a surface is returned into the same hemisphere whose base is the surface and which contains the incident radiation (see Handbook of Optics, $2^{nd}$ ed., McGraw-Hill, Inc., 1995). Often, the substrate is a polymeric material having refractive indexes in the range of 1.48 to 1.65, for example, polymethyl(meth)acrylate (PMMA) has a RI of 1.489; polycarbonate has a RI of 1.585; and polyethylene terephthalate (PET) has a RI of 1.64.

SUMMARY OF THE INVENTION

Typical PSAs and heat-activated adhesives have refractive indices of about 1.47 or less. If these PSAs are used in optical applications, glare and reflectance may occur. Therefore, the need exists for such adhesives which have high refractive indexes.

The present invention provides adhesives which have a refractive index of at least 1.50. These pressure-sensitive and heat-activated adhesives are particularly suitable for optical applications where the substrate, or adherend, similarly has a high refractive index. The pressure-sensitive adhesives of the present invention advantageously allow for the matching of refractive index which reduces glare and reflectance.

In many embodiments, the invention further provides adhesives that are optically clear; having an optical transmission value of at least 85%, preferably at least 90%. The term "optical transmission value" means the percentage of light that is not either reflected back toward the source or absorbed by the film as a percentage of the total incident light at a wavelength of 550 nm (light emitted/light source×100). The adhesives further have less than 2% haze, preferably less than 1%.

The adhesives of the present invention comprise at least one monomer containing a substituted or an unsubstituted biphenyl group. One aspect of the present invention is a pressure-sensitive adhesive comprising the interpolymerized reaction product of: (a) at least one monomer selected from the group consisting of a (meth)acrylic acid ester monomer; and (b) at least one monomer containing a substituted or an unsubstituted biphenyl group. As used herein the term "(meth)acrylic" or "(meth)acrylate" is inclusive of both acrylic and methacrylic (or acrylate and methacrylate).

Another aspect of the present invention is a pressure-sensitive adhesive comprising the interpolymerized reaction product of: (a) at least one (meth)acrylic acid ester monomer, (b) at least one monomer containing a substituted or an unsubstituted biphenyl group; and (c) at least one containing an acid functional monomer.

Yet, another aspect of the present invention is a pressure-sensitive adhesive comprising the interpolymerized reaction product of: (a) at least one (meth)acrylic acid ester monomer, (b) at least one monomer containing a substituted or an unsubstituted biphenyl group; and (c) optionally at least one acid functional monomer; and (d) at least one non-acid containing polar monomer copolymerizable with the monomer(s) of components (a), (b), and (c).

The pressure-sensitive adhesives of the present invention may optionally comprise other monomers, crosslinkers, and other additives.

Another embodiment of the present invention is a substrate coated with the pressure-sensitive adhesives of the present invention.

DETAILED DESCRIPTION OF ILLUSTRATIVE EMBODIMENTS

The present invention relates to adhesives having a refractive index of at least 1.48, preferably at least 1.50. Most preferably, the adhesives have a refractive index of at least 1.54.

The pressure-sensitive adhesives of the present invention have a high refractive index and yet have a good balance of the four properties relevant for pressure-sensitive adhesives: adhesion, cohesion, stretchiness, and elasticity. The adhesives meet the Dahlquist criteria (described in Handbook of Pressure Sensitive Adhesive Technology, D. Satas, $2^{nd}$ ed., page 172 (1989)) at use temperatures. This criterion defines a good pressure sensitive adhesive as one having a 1 second creep compliance of greater than $1 \times 10^{-6}$ cm$^2$/dyne. Alternatively, since modulus is, to a first approximation, the inverse of compliance, pressure sensitive adhesives may be defined as adhesives having a shear modulus of less than $1 \times 10^6$ dynes/cm$^2$.

Refractive index is defined herein as the absolute refractive index of a material (e.g., a monomer or the polymerized product thereof) which is understood to be the ratio of the speed of electromagnetic radiation in free space to the speed of the radiation in that material, with the radiation being of sodium yellow light at a wavelength of about 583.9 nanometers (nm). The refractive index can be measured using known methods and is generally measured using an Abbe Refractometer.

The pressure-sensitive adhesives of the present invention are (meth)acrylate adhesives comprising at least one biphenyl monomer. The pressure-sensitive adhesives comprise at least one (meth)acrylic acid ester of a non-tertiary alcohol, at least and one or more acid-functional monomers and optionally one or more non-acid functional polar monomers. The pressure-sensitive adhesives of the present invention optionally comprise other monomers which may be added to improve the physical properties of the adhesives, such as crosslinkers, and other additives such as tackifiers or plasticizers.

The (meth)acrylic monomers useful in the pressure-sensitive adhesive of the present invention are typically present at ranges from about 5 to about 95 parts by weight, preferably 10 to 90 parts by weight, relative to 100 parts by weight total monomer. Useful acrylic monomers include at least one monomer selected from the group consisting of a monomeric acrylic or methacrylic acid ester of a non-tertiary alkyl alcohol, the alkyl group of which comprises from about 1 to about 12 carbon atoms, preferably from about 4 to about 8 carbon atoms, and mixtures thereof.

Suitable (meth)acrylic ester monomers include, but are not limited to, those selected from the group consisting of the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like, and mixtures thereof. Such monomeric acrylic or methacrylic esters are known in the art and are commercially available.

Preferably the acrylate monomers are selected to impart a low glass transition temperature ($T_g$) to the resultant adhesive. This monomer will typically have a $T_g$ less than 0° C. and more preferably less than –20° C., measured as a function of the homopolymer. Reference may be made to Handbook of Pressure Sensitive Adhesive Technology, D. Satas, $2^{nd}$ ed., page 399 (1989).

The biphenyl monomers are high refractive index acrylic monomers, preferably all of which have homopolymer glass transition temperatures at or below 70° C. These biphenyl monomers, when polymerized alone or in the presence of other acrylic monomers, result in PSAs having RIs higher than are otherwise available. By adjusting the ratio of monomers, it is possible to make PSAs having RIs of at least 1.50. Typically, the adhesive comprises 95 to about 5 parts by weight, preferably 90 to 10 parts by weight, of the biphenyl monomers relative to 100 parts by weight total monomer.

The aromatic monomers of the present invention are represented by the following general of the formula:

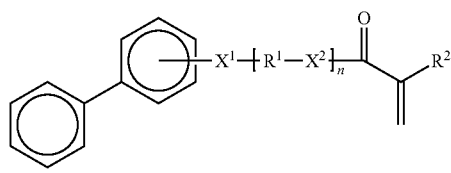

I wherein
$X^1$ and $X^2$ are each independently —O—, —S—, or —NR$^3$—, wherein R$^3$ is H or $C_1$-$C_4$ alkyl preferably $X^1$ and $X^2$ are each —O—;

$R^1$ is an alkylene of 1 to 8 carbons, optionally containing one or more ether oxygen atoms and one or more pendent hydroxy groups;
n is 0 to 3; and
$R^2$ is either H or $CH_3$.

In certain preferred embodiments, $R^1$ is an alkylene of 1 to 8 carbons; i.e. —$C_aH_{2a}$—, where a is 1 to 8. In other embodiments $R^1$ may contain one or more catenary ether oxygen atoms; e.g. —$C_bH_{2b}$—O—$C_cH_{2c}$—, where b and c are at least 1 and b+c is 2 to 8. In another embodiment $R^1$ may contain an pendent hydroxy group; e.g. —$C_bH_{2b}$—CH(OH)—$C_cH_{2c}$—, where b and c are at least 1 and b+c is 2 to 8. If desired, the biphenyl group may be brominated to increase the refractive index of the resulting adhesive. However such bromine substitution may also increase the Tg of the adhesive. The biphenyl ring may have zero to two bromine atoms, and are typically substituted ortho- and/or para- to the $X^1$ group.

Compounds of Formula I, where $R^1$ is 6 to 8 are believed to be novel. It has further been found that these compounds have significantly lower $T_g$'s than homologues where $R^1 \leq 4$, yet retain the high refractive indices, and are therefore useful as high refractive index PSAs. Optionally the homo- and copolymers may be blended with plasticizers and tackifiers as desired.

According to Donatas Satas, Handbook of Pressure Sensitive Adhesives, $1^{st}$ Edition, Von Nostrand Rheinhold, N.Y., 1982: "the glass transition temperature is neither an accurate measurement of polymer stiffness at room temperature, nor is it an accurate measure of pressure sensitive properties. It is an easy and convenient method to predict the suitability of a polymer for pressure-sensitive adhesive application and to predict the effect of a comonomer on the copolymer properties."

The biphenyl-containing monomers of Formula I, where n=0, may be prepared by simple condensation of a (meth) acryloyl compound (such as an ester or acid halide) with a biphenyl compound having a nucleophilic —$X^1$H group. The compounds of Formula I, where n=1-3 may be prepared by a two step synthesis where a biphenyl compound having a nucleophilic —XH group is first alkylated with a compound of the formula $Z^1$—$R^1$—$X^2$H, where $Z^1$ is a leaving group such as a halide, followed by condensation with a (meth) acryloyl compound as follows:

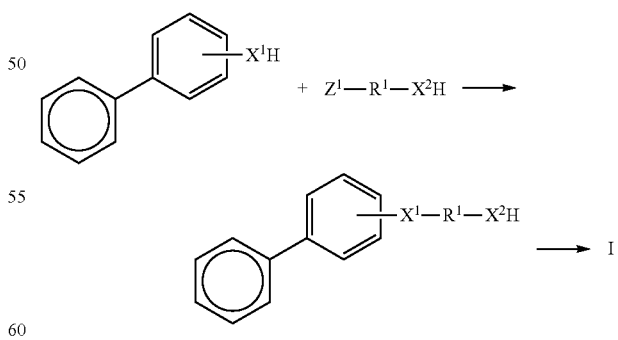

Other methods of preparing the biphenyl monomers of Formula I will be apparent to one skilled in the art. For Example, the monomers of Formula I, where n=2 may be prepared by reaction of a biphenyl compound having a nucleophilic —XH group with ethylene carbonate, followed by condensation with a (meth)acryloyl compound.

The adhesive copolymer may further comprise an acid functional monomer, where the acid functional group may be an acid per se, such as a carboxylic acid, or a salt thereof such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the present invention are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer, when present, is generally used in amounts of 1 to 15 parts by weight, preferably 1 to 10 parts by weight, based on 100 parts by weight total monomer. In some embodiments, such as in electronic application, acid functional monomers are not present, as they deleteriously affect the performance of such devices.

The adhesive copolymer may further comprise other polar monomer exclusive of the acid functional monomers to increase the cohesive strength of the pressure-sensitive adhesive. Useful polar monomers include, but are not limited to, acrylamides, N-alkyl (meth)acrylamides, N,N-dialkyl substituted (meth)acrylamides, N-vinyl lactams, and N,N-dialkylaminoalkyl (meth)acrylates, hydroxyalkyl(meth)acrylates, and mixtures thereof. Illustrative examples include, but are not limited to, those selected from the group consisting of N,N-dimethyl (meth)acrylamide, N,N-diethyl (meth)acrylamide, N,N-dimethylaminoethyl (meth)acrylate, N,N-dimethylaminopropyl (meth)acrylate, N,N-dimethylaminopropyl (meth)acrylate, 2-hydroxyethyl acrylate, and the like, and mixtures thereof.

Preferred non-acid polar monomers include acrylamide, methacrylamide, acrylonitrile, methacrylonitrile, and mixtures thereof. Generally, non-acid polar monomers are typically present at ranges from about 0 to about 12 parts by weight, preferably from about 2 to about 8 parts by weight, based on 100 parts by weight total monomer.

Other vinyl monomers may be added to improve performance, reduce cost, etc. in quantities which do not render the pressure-sensitive adhesive non-tacky. When used, vinyl monomers useful in the adhesive copolymer include vinyl esters (e.g., vinyl acetate and vinyl propionate), styrene, substituted styrene (e.g., α-methyl styrene), and mixtures thereof. Such vinyl monomers are generally used at 0 to 5 parts by weight, preferably 1 to 5 parts by weight, based on 100 parts by weight total monomer.

The adhesive copolymer may have the generalized Formula IV:

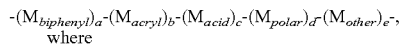
where

-$(M_{biphenyl})_a$- represents monomer units having pendent biphenyl groups of Formula I, and subscript "a" represents the parts by weight thereof;
-$(M_{acryl})_b$- represents alkyl (meth)acrylate monomer units and subscript "b" represents the parts by weight thereof;
-$(M_{acid})_c$- represents acid functional monomer units and subscript "c" represents the parts by weight thereof;
-$(M_{polar})_d$- represents polar monomer units and subscript "d" represents the parts by weight thereof; and
-$(M_{other})_e$- represents other monomer units and subscript "e" represents the parts by weight thereof;
wherein the sum of a+b+c+d+e is 100 parts by weight. Formula IV represents a random copolymer. Formula IV may further comprise the residue of a chain transfer agent and an initiator.

In one embodiment the subscripts are such that:
"a" represents 5 to 95 parts by weight of said monomer units having pendent biphenyl groups;
"b" represents 95 to 5 parts by weight of said alkyl (meth)acrylate monomer units;
"c" represents 0 to 15 parts by weight of acid functional monomer units;
"d" represents 0 to 15 parts by weight of polar monomers; and
"e" represents 0 to 5 parts by weight of other monomers,
wherein the sum of the monomers is 100 parts by weight.

In another embodiment the subscripts are such that:
"a" represents 10 to 90 parts by weight of said monomer units having pendent biphenyl groups;
"b" represents 90 to 10 parts by weight of said alkyl (meth)acrylate monomer units;
"c" represents 1 to 15 parts by weight of acid functional monomer units;
"d" represents 0 to 15 parts by weight of polar monomers; and
"e" represents 0 to 5 parts by weight of other monomers,
wherein the sum of the monomers is 100 parts by weight.

In another embodiment "d" represents 2 to 8 parts by weight of polar monomers, based on 100 parts by weight total monomers.

In another embodiment "e" represents 1 to 5 parts by weight of "other" monomers, based on 100 parts by weight total monomers.

In certain preferred embodiments, which maximize the refractive indices of the resulting adhesive, the subscripts are such that:
"a" represents greater than 40, preferably greater than 45, more preferably greater than 50 parts by weight of said monomer units having pendent biphenyl groups;
"b" represents 2 to 60, preferably less than 55, more preferably less than 50 parts by weight of said alkyl (meth)acrylate monomer units;
"c" represents 0 to 5, preferably 1 to 5 parts by weight of acid functional monomer units;
"d" represents 0 to 15 parts by weight of polar monomers; and
"e" represents 0 to 5 parts by weight of other monomers,
wherein the sum of the monomers is 100 parts by weight.

The copolymerizable mixture of monomers may further comprise chain transfer agents to control the molecular weight of the resultant copolymer. Examples of useful chain transfer agents include but are not limited to those selected from the group consisting of alcohols, mercaptans, and mixtures thereof. A preferred chain transfer agent are isooctylthioglycolate. The mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

In order to increase cohesive strength of the poly(meth) acrylate pressure sensitive adhesives, a crosslinking agent may be incorporated into the adhesive composition. Two main types of chemical crosslinking agents are exemplary. The first crosslinking additive is a thermal crosslinking agent such as multifunctional aziridine, isocyanate, oxazole and epoxy compounds. One example of aziridine crosslinker is 1,1'-(1,3-phenylene dicarbonyl)-bis-(2-methylaziridine)

(CAS No. 7652-64-4). Other bisamide crosslinking agents are described in U.S. Pat. No. 6,893,718 (Melancon et al.). Common polyfunctional isocyanate crosslinkers are trimethylolpropane toluene diisocyanate, toluene diisocyanate, and others known in the art. Such chemical crosslinkers can be added into solvent-based PSAs after polymerization and activated by heat during oven drying of the coated adhesive.

Bisamide crosslinking agents may be of the formula

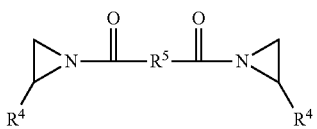

II where,
each $R^4$ is independently selected from the group consisting of H and $C_nH_{2n+1}$, where n is an integer ranging from 1 to 5, $R^5$ is a divalent radical selected from the group consisting of phenyl, substituted phenyl, triazine, and —$C_nH_{2m}$—, where m is an integer ranging from 1 to 10, and combinations thereof.

Multifunctional oxazoline crosslinking agents useful in this invention are those that contain two or more groups per molecule selected from the group consisting of 2-oxazolines, 2 oxazines and combinations thereof. Preferred 1,3-oxazyl heterocyclic compounds are 1,3-oxazolines, and a particularly preferred 1,3-oxazoline is 2-phenyl-2-oxazoline. Bisoxazolines are typically derived from polycarboxylic acids and such polycarboxylic acids include, but are not limited to aromatic acids; for example, isophthalic acid, terephthalic acid, 5-t-butylisophthalic acid, trimesic acid, 1,2,4,5-benezenetetracarboxylic acid and 2,6-naphthalene dicarboxylic acid. The preferred polycarboxylic acids include isophthalic acid, terephthalic acid and trimesic acid.

Polyfunctional 1,3-oxazyl heterocyclic compounds useful in this invention can be conveniently prepared by the reaction of the corresponding esters of a polycarboxylic acids and alkanolamines Nonlimiting examples of poly(1,3-oxazyl heterocyclic) compounds including bisoxazolines are those having a nucleus represented by the following Formula III:

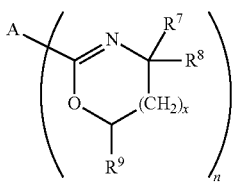

III wherein A is selected from the group consisting of a cyclic or acyclic aliphatic or substituted cyclic or acyclic aliphatic moiety having from 1 to 20 carbon atoms or an aromatic (aryl) mono- or multinuclear or aliphatic substituted aryl residue having from 6 to 20 carbon atoms and a polymeric or oligomeric residue comprising from about 2 to 200,000 repeating units;

$R^7$ independently represents H, $CH_3$, $CH_2CH_3$, or $C_6H_5$;
$R^8$ and $R^9$ independently represent H or $CH_3$, preferably $R^7$ and $R^9$ are not both $CH_3$;
x represents an integer of 0 or 1;
n is an integer of 2 or more, preferably 2 or 3.

Useful multifunctional oxazoline crosslinking agents include but is not limited to 4,4'-5,5'-tetrahydro-2,2'-bisoxazole, (that is, 2,2'-bis(2-oxazoline)); 2,2'-(alkanediyl)bis[4,5-dihydrooxazole], for example, 2,2'-(1,4-butanediyl)bis[4,5-dihydrooxazole] and 2,2'-(1,2-ethanediyl)bis[4,5-dihydrooxazole]; 2,2'-(arylene)bis[4,5-dihydrooxazole], e.g., 2,2'-(1,4-phenylene)bis[4,5-dihydrooxazole]; 2,2'-(1,5-naphthalenyl)bis[4,5-dihydrooxazole] and 2,2'-(1,8-anthracenyl)bis[4,5-dihydrooxazole]; sulfonyl, oxy, thio or alkylene bis 2-(arylene)[4,5-dihydrooxazole], for example, sulfonyl bis 2-(1,4-phenylene)bis[4,5-dihydrooxazole], oxybis 2-(1,4-phenylene)bis[4,5-dihydrooxazole], thiobis 2-(1,4-phenylene)bis[4,5-dihydrooxazole] and methylene bis 2-(1,4-phenylene)bis[4,5-dihydrooxazole]; 2,2',2"-(arylene tris[4,5-dihydrooxazole], e.g., 2,2',2"-(1,3,5-phenylene tris [4,5-dihydrooxazole]; 2,2',2", 2'''-(arylene tetra[4,5-dihydrooxazole], for example, 2,2',2", 2'''-(1,2,4,5-phenylene tetra[4,5-dihydrooxazole] and oligomeric and polymeric materials having terminal oxazoline groups.

Typically, such crosslinkers are used in amounts of about 0.05 to 1.0 pph crosslinker per 100 pph (on solids) of adhesive copolymer.

In another embodiment, chemical crosslinkers which rely upon free radicals to carry out the crosslinking reaction may be employed. Reagents such as, for example, peroxides serve as a source of free radicals. When heated sufficiently, these precursors will generate free radicals by hydrogen abstraction, which bring about a crosslinking reaction of the polymer. A common free radical generating reagent is benzoyl peroxide. Free radical generators are required only in small quantities, but generally require higher temperatures to complete a crosslinking reaction than those required for the bisamide reagent.

The second type of chemical crosslinker is a photosensitive crosslinker which is activated by high intensity ultraviolet (UV) light. Two common photosensitive crosslinkers used for acrylic PSAs are benzophenone and copolymerizable aromatic ketone monomers as described in U.S. Pat. No. 4,737,559. Another photocrosslinker, which can be post-added to the solution polymer and activated by UV light is a triazine, for example, 2,4-bis(trichloromethyl)-6-(4-methoxy-phenyl)-s-triazine. These crosslinkers are activated by UV light generated from artificial sources such as medium pressure mercury lamps or a UV blacklight.

Polyethylenically unsaturated compounds, such as multifunctional acrylates are useful as crosslinking agent in bulk or emulsion polymerization processes. Examples of polyethylenically unsaturated compounds include, but are not limited to, polyacrylic-functional monomers such as ethylene glycol diacrylate, propylene glycol dimethacrylate, bisphenol-A di(meth)acrylate, trimethylolpropane triacrylate, 1,6-hexanedioldiacrylate, pentaerythritol di-, tri-, and tetraacrylate, and 1,12-dodecanedioldiacrylate; olefinic-acrylic-functional monomers such as allyl methacrylate, 2-allyloxycarbonylamidoethyl methacrylate, and 2-allylaminoethyl (meth)acrylate; allyl 2-acrylamido-2,2-dimethylacetate; divinylbenzene; vinyloxy group-substituted functional monomers such as 2-(ethenyloxy)ethyl (meth)acrylate, 3-(ethynyloxy)-1-propene, 4-(ethynyloxy)-1-butene, and 4-(ethenyloxy)butyl-2-acrylamido-2,2-dimethylacetate, and the like.

The polyethylenically unsaturated crosslinker is typically present from 0.05 to about 1 part by weight, preferably 0.1 to 0.5 parts by weight, based on 100 parts by weight adhesive copolymer solids.

Crosslinking may also be achieved using high energy electromagnetic radiation such as gamma or e-beam radiation. In this case, no additional crosslinker may be required.

Following copolymerization, other additives may be blended with the resultant acrylate or methacrylate copolymer. For example, compatible tackifiers and/or plasticizers may be added to aid in optimizing the ultimate tack and peel properties of the PSA. The use of such tackifiers is common in the art, as is described in the *Handbook of Pressure-Sensitive Adhesive Technology*, edited by Donatas Satas (1982).

Examples of useful tackifiers include, but are not limited to, rosin, rosin derivatives, polyterpene resins, coumarone-indene resins, and the like. Plasticizers which may be added to the adhesive of the invention may be selected from a wide variety of commercially available materials.

Representative plasticizers include polyoxyethylene aryl ether, dialkyl adipate, 2-ethylhexyl diphenyl phosphate, t-butylphenyl diphenyl phosphate, di-(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate. When used, tackifiers are preferably added in an amount not to exceed about 50 parts by weight per 100 parts by weight copolymer, and plasticizer may be added in an amount up to about 50 parts by weight per 100 parts by weight copolymer.

Preferably any added tackifier and/or plasticizer has a refractive index of at least 1.50, so that incorporation does not reduce the refractive index of the pressure-sensitive adhesive. Reference may be made to Handbook of Plasticizers, George Wypych, Editor, ChemTec Publishing, Toronto-Scarborough, Ontario, Canada, ISBN 1-895198-29-1, and to Wypych, Anna, Plasticizers Database (2nd Electronic Edition). ChemTec Publishing.

Useful high refractive index plasticizers include aromatic phosphate esters, phtalates, benzoic ethers, aromatic sulfonamide, and some rosins. The phosphate esters and phtalates are preferred. Exemplary plasticizer include diethylene glycol dibenzoate (1.5424 n25/D), 4-(tert-butyl)phenyl diphenyl phosphate (1.555 n25/D), trimethylphenyl phosphate (1.5545 n25/D), triphenyl phosphate (1.5575 n25/D), phenylmethyl benzoate (1.56 n25/D), diethylene glycol dibenzoate (1.5424 n25/D), butyl benzyl phthalate (1.537 n25/D), methyl ester of rosin (1.531 n20/D), alkyl benzyl phthalate (1.526 n25/D), butyl(phenylsulfonyl)amine (1.525 n20/D), benzyl phthalate (1.518 n25/D), trimethyl trimellitate (1.523 (n20/D), and 2-ethylhexyl diphenyl phosphate (1.51 (n20/D).

Further, for optical applications, tackifiers, plastizicers and other additives should have low color; i.e. a Gardner value of <3, preferably <1. Further, plasticizers should be selected to be compatible, i.e. miscible, with the polymer matrix and the polymerization medium.

Other additives can be added in order to enhance the performance of the adhesive compositions. For example, leveling agents, ultraviolet light absorbers, hindered amine light stabilizers (HALS), oxygen inhibitors, wetting agents, rheology modifiers, defoamers, biocides, dyes, pigments and the like, can be included herein. All of these additives and the use thereof are well known in the art. It is understood that any of these compounds can be used so long as they do not deleteriously affect the adhesive and optical properties.

Also useful as additives to the present compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl) [3,5-bis(1,1-dimethylethyl-4-hydroxyphenyl) methyl]butylpropanedioate, available as Tinuvin™144, from CIBA-GEIGY Corporation, Hawthorne, N.Y.

The following UV absorbers and combinations thereof in concentrations of less than 5 parts by weight based on the total monomer composition, may produce desirable results: bis(1, 2,2,6,6-pentamethyl-4-piperidinyl)(3,5-bis(1,1-dimethyl-ethyl 1-4-hydroxyphenyl)methyl)butylpropanedioate, 2-ethylhexyl-2-cyano-3,3'-diphenylacrylate, 2-hydroxyl-4-n-octoxybenzophenone, 2-(2'-hydroxy-5'-methylphenyl) benzotriazole, poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy, and Uvinul®. D-50 and MS-40, sold by BASF Wyandotte Inc., Parsippany, N.J. Concentrations of UV absorbers, however, in the range of 1 to 5 percent based on the total weight of the composition are preferred.

The adhesive copolymers herein may be prepared by any conventional free radical polymerization method, including solution, radiation, bulk, dispersion, emulsion, and suspension processes. For optical applications, solution, UV and bulk processes are preferred. Other processes may introduce birefringence or foreign materials that may affect optic properties.

The adhesive copolymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado). Preferably, the (meth)acrylate copolymer is prepared by an emulsion polymerization process in the presence of a free-radical initiator.

Water-soluble and oil-soluble initiators useful in preparing the (meth)acrylate adhesive copolymers used in the present invention are initiators that, on exposure to heat, generate free-radicals which initiate (co)polymerization of the monomer mixture. Water-soluble initiators are preferred for preparing the (meth)acrylate polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO 64 (2,2'-azobis(isobutyronitrile)) and VAZO 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of monomer components in the pressure-sensitive adhesive.

Polymerization via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof.

Preferably, the emulsion polymerization is carried out in the presence of anionic surfactant(s). A useful range of surfactant concentration is from about 0.5 to about 8 weight percent, preferably from about 1 to about 5 weight percent, based on the total weight of all monomers of the emulsion pressure-sensitive adhesive.

Alternatively, the copolymers can be polymerized by techniques including, but not limited to, the conventional techniques of solvent polymerization, dispersion polymerization, and solventless bulk polymerization. The monomer mixture may comprise a polymerization initiator, especially a thermal initiator or a photoinitiator of a type and in an amount effective to polymerize the comonomers, as previously described.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In a typical photopolymerization method, a monomer mixture may be irradiated with ultraviolet (UV) rays in the presence of a photopolymerization initiator (i.e., photoinitiators). Preferred photoinitiators are those available under the trade designations IRGACURE and DAROCUR from Ciba Speciality Chemical Corp., Tarrytown, N.Y. and include 1-hydroxy cyclohexyl phenyl ketone (IRGACURE 184), 2,2-dimethoxy-1,2-diphenylethan-1-one (IRGACURE 651), bis (2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173). Particularly preferred photoinitiators are IRGACURE 819, 651, 184 and 2959.

Solventless polymerization methods, such as the continuous free radical polymerization method described in U.S. Pat. Nos. 4,619,979 and 4,843,134(Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

The adhesive emulsions (containing the adhesive copolymer and water) may be of any desirable concentration for subsequent coating, but is typically between 30 to 70 wt. % water, and more typically between 50 and 65 wt. % water. The desired concentration may be achieved by further dilution of the emulsion, or by partial drying.

EXAMPLES

The present invention will be further described with reference to the following non-limiting examples and test methods. All parts, percentages, and ratios are by weight unless otherwise specified.

Preparative Example 1

Synthesis of 6-(Biphenyl-2-yloxy)-hexan-1-ol

To a two liter three neck round bottom flask was added 2-hydroxy biphenyl (100 g.), water (635 g.), sodium iodide (8.8 g.) and sodium hydroxide (94 g. of 50% in water). This mixture was heated to 100° C. with agitation. To this was added 6-chloro-1-hexanol (160.5 g.) dropwise over about one hour, followed by heating at 100° C. for an additional three hours. Gas Chromatography showed less than 2% residual starting material. The reaction mixture was cooled to room temperature, ethyl acetate (900 g) was added and the aqueous phase was removed. The organic phase was washed with water (500 g. containing 25 g. HCl), followed by a second wash with water (500 g.). The solvent was removed under reduced pressure on a rotary evaporator. The crude product was distilled under vacuum, first removing residual 6-chlorohexanol, then continuing until the pot reaches about 100° C. at 1 mm Hg. 150 g of yellow oil was obtained. GC indicated the 6-(biphenyl-2-yloxy)-hexan-1-ol was 95.5% pure.

Preparative Example 2

Synthesis of Acrylic acid 6-(biphenyl-2-yloxy)-hexyl ester (BPHA)

To a one liter three neck round bottom flask add 6-(biphenyl-2-yloxy)-hexan-1-ol (145 g), toluene (500 g.), para-toluene sulfonic acid (5.5 g.), acrylic acid (46.4 g.), hydroquinone (0.06 g.) and hydroquinone monomethyl ether (0.06 g.). The mixture was heated to reflux, using a Dean-Stark trap to collect the water azeotrope. After 6 hours, gas chromatography showed<1% starting materials. The reaction mixture was cooled to room temperature, washed with water (200 g. containing 10 g. HCl); then water (200 g containing 10 g. sodium carbonate); and then water (200 g. containing 10 g. NaCl).

The solvent was removed under reduced pressure on a rotor evaporator to yield the acrylate monomer product as a light yellow colored oil (101 g.). GC showed it is 96% pure. The product monomer had a refractive index of 1.5497 and the $T_g$ of the homopolymer is −2° C.

Preparatory Example 3

Synthesis of 8-(biphenyl-2-yloxy)-octan-1-ol

The compound was prepared using essentially the procedure of Preparatory Example 1 with 2-hydroxy biphenyl (40 g.), water (250 g.), sodium iodide (3.5 g.) and sodium hydroxide (37.6 g. of 50% in water). This mixture was heated to 100° C. with agitation and 8-chloro-1-octanol (77.4 g.) was added. The product was recovered essentially as in Preparatory Example 1.

Preparatory Example 4

Acrylic Acid 8-(biphenyl-2-yloxy)-octyl ester

The monomer was prepared using essentially the procedure of Preparatory Example 3 with 8-(biphenyl-2-yloxy)-octan-1-ol (50 g), toluene (300 g.), para-toluene sulfonic acid (1.7 g.), acrylic acid (14.5 g.), hydroquinone (0.02 g.) and hydroquinone monomethyl ether (0.02 g.) This acrylate monomer has a refractive index of 1.5438 and a homopolymer of which has a $T_g$ of −13° C.

Polymerization Methods

The pressure-sensitive adhesives can be prepared by conventional free-radical polymerization and suitable living radical polymerizations methods. Suitable methods of polymerization include solution polymerization, suspension polymerization, emulsion polymerization, and bulk polymerization. The following components were used:

TABLE I

| Components | | |
|---|---|---|
| Abbreviation | Name | Available from |
| AA | acrylic acid | BASF Corporation, Parsippany, NJ |
| BA | n-butyl acrylate | BASF Corporation, Parsippany, NJ |
| IOA | iso-octyl acrylate | CPS Chemcial Co. Old Bridge, NJ |
| EHA | 2-ethyl hexyl acrylate | Sigma-Aldrich, Milwaukee, WI |
| PEA | Phenoxy ethyl acrylate | Ciba |
| HDDA | 1,6-hexanediol diacrylate | Sigma-Aldrich, Milwaukee, WI |
| BPHA | Acrylic acid 6-(biphenyl-2-yloxy)-hexyl ester | Preparative Examples 1 and 2 |
| BPEA | Acrylic acid 6-(biphenyl-2-yloxy)-ethyl ester | Toagosei TO-1463, |
| BPA | 2-biphenyl acrylate | Toagosei TO-2344 |
| IOTG | Isooctyl thioglycolate | TCI America, Portland, OR |
| bisAmide crosslinker | 1,1'-(1,3-phenylene dicarbonyl))-bis-(2-methylaziridine) | Yingkou Tanyun Fine Chemical Industry Co. Ltd, China |
| IRGACURE 651 | 2,2-dimethoxy-1,2-diphenylethane-1-one | Ceiba-Geigy, Hawthorne, NY |
| VAZO ™ 67 | 2,2'-azobis(2-methylbutanenitrile) | E. I. Du Pont De Nemours and Co., Wilmington DE |
| Santicizer ™ 154 | Triphenyl phosphate | Ferro Corporation, Cleveland, OH |
| RHODOCAL DS-10 ™ | sodium dodecyl-benzene sulfonate | Rhone-Poulenc North American Chem., Cranbury, NJ |
|  | $K_2S_2O_8$ | J. T. Baker Co., Phillipsburge, NJ |

Solution Polymerization

All components were weighed into a glass bottle having a 120 gram capacity in the amounts shown in Table II. The contents of the bottles were deoxygenated by purging with nitrogen at a flow rate of 1 liter per minute for 5 minutes. The bottles were sealed and placed in a rotating water bath at 60° C. for 24 hours to effect essentially complete polymerization. An adhesive film was prepared by further adding 0.10 parts by solids of bisamide as a crosslinking agent to the polymer solution. The polymer solutions were coated onto a 37 micrometer (1.5 mil) polyester film to provide a dry coating thickness of 25 micrometers (~1 mil). After heat drying in a 70° C. oven for 10 minutes, the coated film was equilibrated and thereafter tested under conditions of about 23° C. and 50% relative humidity as described by the adhesion test methods. Equilibrated films were utilized to measure refractive index.

Emulsion Polymerization

All components were added to a 500 ml beaker and mixed until the aqueous and organic phases were homogeneous in the amounts shown in Table III. The mixture was then homogenized in a Waring Blender for 2 minutes to prepare emulsions for polymerization. The emulsions were placed in glass bottles having a 120 gram capacity. The contents of the bottles were deoxygenated by purging with nitrogen at a flow rate of 1 liter per minute for 5 minutes. The bottles were sealed and placed in a rotating water bath at 60° C. for 24 hours to effect essentially complete polymerization. After polymerization, the latexes were filtered through cheese cloth to remove coagulum before coating and evaluation. The polymer latexes were coated onto a 37 micrometer (1.5 mil) polyester film to provide a dry coating thickness of about 25 micrometers (~1 mil). The coated films were equilibrated and thereafter tested under conditions of about 23° C. and 50% relative humidity as described by the adhesion test methods. Equilibrated films were utilized to measure refractive index.

Bulk Polymerization

The monomer components, in the amounts shown in Table IV, were mixed in 250 ml glass bottles to which was added IRGACURE 651 (0.2% of total monomer weight). The contents of the bottles were thoroughly mixed and deoxygenated by purging with nitrogen at a flow rate of 1 liter per minute for 5 minutes. Using a knife coater, the mixtures were coated to a thickness of about 50-80 micrometers (~2-3 mils) between a primed 38 micrometer (1.5 mil) polyester film and a release liner. The resulting coatings were polymerized using ultraviolet radiation under a fluorescent black light (about 680 millijoules/cm$^2$) and thereafter tested under conditions of about 23° C. and 50% relative humidity as described by the adhesion test methods. Equilibrated films were utilized to measure refractive index as noted above Test Methods The test methods used to evaluate the PSA coated flexible sheet materials of the examples are industry standard tests. The standard tests are described in various publications of the American Society for Testing and Materials (ASTM), Philadelphia, Pa., and the Pressure Sensitive Tape Council (PSTC).

Peel Adhesion (ASTM D3330-78 PSTC-1 (11/75))

Peel adhesion is the force required to remove a coated flexible sheet material from a test panel measured at a specific angle and rate of removal. In the examples, this force is expressed in Newtons per 100 mm (N/100 mm) width of coated sheet. The procedure followed is:

1. A 12.7 mm width of the coated sheet is applied to the horizontal surface of a clean glass test plate with at least 12.7 lineal cm in firm contact. A 2 kg hard rubber roller is used to apply the strip.

2. The free end of the coated strip is doubled back nearly touching itself so the angle of removal will be 180°. The free end is attached to the adhesion tester scale.

3. The glass test plate is clamped in the jaws of a tensile testing machine which is capable of moving the plate away from the scale at a constant rate of 0.3 meters per minute.

4. The scale reading in Newtons is recorded as the tape is peeled from the glass surface. The data is reported as the average of the range of numbers observed during the test.

Measurement of Refractive Index

The refractive indices of the adhesives were measured using an Abbe Refractometer, Made by Erma Inc., of Tokyo, Japan and distributed by Fisher Scientific.

Measurement of Glass Transition ($T_g$)

The $T_g$ of the heat activated adhesives was measured using a Differential Scanning calorimetry (DSC) Q200 instrument, made by TA Instruments, New Castle, Del., USA.

Measurement of Haze

Haze and Transmission of the adhesive films were measured with a BYK Gardner Spectrophotometer according to ASTM D1003 and are reported as the A2* value, which represents the haze under the light of a tungsten filament lamp (operated at a correlated temperature of about 2854K).

TABLE II

PSA comparative examples, prepared by solution polymerization

| Example | Example formula | Monomers (g) | | | Solvent (g) | Initiator (g) VAZO 67 | Refractive Index, (RI) | Peel adhesion, (N/dm) |
|---|---|---|---|---|---|---|---|---|
| | | BA | AA | | | | | |
| Comparative 1 | BA/AA 98/2 | 39.2 | 0.8 | | Ethyl acetate | 60 | 0.08 | 1.4659 | 7.3 |
| | | BA | AA | BPA | | | | |
| 5 | BA/AA/BPA 88/2/10 | 7.92 | 0.18 | 0.89 | Ethyl Acetate | 22.5 | 0.027 | 1.4804 | 51.0 |
| 6 | BA/AA/BPA 78/2/20 | 7 | 0.18 | 1.8 | Ethyl Acetate | 22.5 | 0.027 | 1.4955 | 56.0 |
| 7 | BA/AA/BPA 58/2/40 | 5.19 | 0.18 | 3.61 | Ethyl Acetate | 22.5 | 0.027 | 1.5272 | 61.5 |
| 8 | BA/AA/BPA 38/2/60 | 3.41 | 0.18 | 5.41 | Ethyl Acetate | 22.5 | 0.027 | 1.5582 | 0.3 |
| 9 | BA/AA/BPA 18/2/80 | 7.2 | 0.8 | 32 | Ethyl Acetate | 60 | 0.08 | 1.5783 | 0.1 |
| | | BA | AA | BPEA | | | | |
| 10 | BA/AA/BPEA 88/2/10 | 7.91 | 0.18 | 0.92 | Ethyl acetate | 22.5 | 0.02 | 1.4794 | 44.1 |
| 11 | BA/AA/BPEA 58/2/40 | 23.2 | 0.8 | 16 | Ethyl Acetate | 60 | 0.08 | 1.5210 | 54.3 |
| 12 | BA/AA/BPEA 38/2/60 | 3.41 | 0.18 | 5.41 | Ethyl Acetate | 22.5 | 0.02 | 1.5495 | 61.7 |
| 13 | BA/AA/BPEA 18/2/80 | 7.2 | 0.8 | 32 | Ethyl acetate | 60 | 0.08 | | |
| | | BA | AA | BPHA | | | | |
| 14 | BA/AA/BPHA 88/2/10 | 7.95 | 0.18 | 0.9 | Acetone | 22.5 | 0.02 | 1.4777 | 48.5 |
| 15 | BA/AA/BPHA 78/2/20 | 7.02 | 0.18 | 1.8 | Acetone | 22.5 | 0.02 | 1.4895 | 51.1 |
| 16 | BA/AA/BPHA 58/2/40 | 5.22 | 0.18 | 3.6 | Acetone | 22.5 | 0.02 | 1.5121 | 60.8 |
| | | IOA | AA | BPA | | | | |
| 17* | IOA/AA/BPA 78/2/20 | 39 | 1 | 10 | Ethyl acetate | 75 | 0.075 | 1.4991 | 109.3 |
| 18* | IOA/AA/BPA 58/2/40 | 29 | 1 | 20 | Ethyl acetate | 75 | 0.075 | 1.5287 | 55.7 |
| 19* | IOA/AA/BPA 38/2/60 | 19 | 1 | 30 | Ethyl acetate | 75 | 0.075 | 1.5595 | — |
| 20* | IOA/AA/BPA 18/2/80 | 9 | 1 | 40 | Ethyl acetate | 75 | 0.075 | — | — |
| | | IOA | AA | BPEA | | | | |
| 21* | IOA/AA/BPEA 58/2/40 | 29 | 1 | 20 | Ethyl acetate | 75 | 0.075 | 1.5240 | 97.5 |
| 22* | IOA/AA/BPEA 38/2/60 | 19 | 1 | 30 | Ethyl acetate | 75 | 0.075 | 1.5525 | 58.1 |
| 23* | IOA/AA/BPEA 18/2/80 | 9 | 1 | 40 | Ethyl acetate | 75 | 0.075 | — | — |
| | | IOA | AA | BPHA | | | | |
| Comparative 24* | IOA/AA/BPHA 58/2/40 | 29 | 1 | 20 | Ethyl acetate | 75 | 0.075 | 1.5134 | 42.4 |
| 25* | IOA/AA/BPHA 38/2/60 | 19 | 1 | 30 | Ethyl acetate | 75 | 0.075 | 1.5359 | 63.1 |
| 26* | IOA/AA/BPHA 18/2/80 | 9 | 1 | 40 | Ethyl acetate | 75 | 0.075 | 1.5588 | 79.9 |
| 27* | IOA/AA/BPHA 0/2/98 | 0 | 1 | 49 | Ethyl acetate | 75 | 0.075 | 1.5806 | 49.4 |

*Examples 17-20 further contained 0.025 g of isothioglycolate, Examples 21-23 further contained 0.05 g of isothioglycolate, Examples 24-27 further contained 0.08 g of isothioglycolate.

TABLE III

Emulsion polymerized PSA example

| Example ID | Example formula | Monomers (g) BA | AA | BPA | Water (g) | Rhodocal (g) 23% in water | Initiator (g) $K_2S_2O_8$ | Refractive Index, (RI) | Peel adhesion, (N/dm) |
|---|---|---|---|---|---|---|---|---|---|
| 28 | BA/AA/BPA 73/2/25 | 18.25 | 0.5 | 6.25 | 37.4 | 1.74 | 0.05 | 1.5034 | 35.6 |

TABLE IV

Bulk polymerized PSA examples

| | Example formula | Monomers (g) | | | Irgacure 651 (g) | HDDA (g) | Refractive Index, (RI) | Peel adhesion, (N/dm) |
|---|---|---|---|---|---|---|---|---|
| Comparative Example | | IOA | AA | | | | | |
| Comparative 2 | IOA/AA 98/2 | 9.8 | 0.2 | | 0.02 | 0.01 | 1.4685 | 47.0 |
| | | IOA | AA | BPA | | | | |
| 29 | IOA/AA/BPA 58/2/40 | 5.8 | 0.2 | 4 | 0.02 | 0.01 | 1.5175 | 51.1 |
| 30 | IOA/AA/BPA 48/2/50 | 4.8 | 0.2 | 5 | 0.02 | 0.01 | 1.5370 | 132.6 |
| 31 | IOA/AA/BPA 38/2/60 | 3.8 | 0.2 | 6 | 0.02 | 0.01 | 1.5525 | 46.6 |
| 32 | IOA/AA/BPEA 58/2/40 | 5.8 | 0.2 | 4 | 0.02 | 0.01 | 1.5176 | 60.6 |
| 33 | IOA/AA/BPEA 48/2/50 | 4.8 | 0.2 | 5 | 0.02 | 0.01 | 1.5306 | 82.1 |
| 34 | IOA/AA/BPEA 38/2/60 | 3.8 | 0.2 | 6 | 0.02 | 0.01 | 1.5447 | 94.3 |
| | | BA | AA | BPHA | | | | |
| 35 | BA/AA/BPHA (58/2/40) | 5.22 | 0.18 | 3.6 | 0.02 | 0.01 | 1.5092 | 22.7 |
| | | EHA | AA | BPHA | | | | |
| 36 | EHA/AA/BPHA (58/2/40) | 5.22 | 0.18 | 3.6 | 0.02 | 0.01 | 1.5095 | 18.1 |
| 37 | EHA/BPHA (60/40) | 6 | 0 | 4 | 0.02 | 0.01 | 1.5077 | 8.2 |
| | | IOA | AA | BPHA | | | | |
| 38 | IOA/AA/BPHA (58/2/40) | 5.22 | 0.18 | 3.6 | 0.02 | 0.01 | 1.5093 | 19.8 |
| Comparative Examples | | EHA | PEA | | | | | |
| Comp. 3 | EHA/PEA (60/40) | 6 | 4 | | 0.02 | 0.01 | 1.4986 | 3.8 |
| Comp4 | EHA/PEA (50/50) | 5 | 5 | | 0.02 | 0.01 | 1.5064 | 4.7 |
| Comp. 5 | EHA/PEA (40/60) | 4 | 6 | | 0.02 | 0.01 | 1.5177 | 5.7 |

Further useful examples of this invention include formulating polymers such as those synthesized in the previous examples with plasticizers to modify the tack, peel, conformability and refractive index of the final product. In the Tables, the peel adhesion, $T_g$, and refractive index of various formulations are shown. This demonstrates the utility of plasticizers to formulate adhesives exhibiting a range of adhesive performance and refractive index values.

PSA formulations have sufficient conformability, tack and adhesion to form a bond to a substrate at room temperature. One measure of a materials' suitability for a particular application is the materials' glass transition temperature ($T_g$). In principle a PSA material should have a $T_g$ of 0° C. or lower in order to have effective adhesion at room temperature, a heat activated adhesive (HAA) may exhibit a $T_g$ significantly greater than this, but below normal processing temperatures, (e.g. 100° C.). HAAs, when heated above an activation temperature during or prior to application to a substrate forms an effective adhesive bond that persist at the ultimate use temperature of the article. BPA based PSA and HAA formulations are shown in table V, BPEA based PSA and HAA formulations are shown in table VI, BPHA based PSA formulations are shown in table VII. The plasticizers additives utilized in the examples shown in tables V to VIII were composed, at least in part, of triphenyl phosphate which exhibits a refractive index around 1.55.

TABLE V

Examples of BPA based PSA formulations including solution polymerized polymer blended with Ferro Santicizer 154 Plasticizer. The refractive index (n/D) at 23° C. is shown for all examples. Peel adhesion strength is shown for PSA formulations, the Tg is shown for heat activated adhesives formulations.

| Ferro Santicizer 154 (wt %) | | | |
|---|---|---|---|
| 40 | | | 17.7 N/dm n/D = 1.5767 |
| 30 | | | 15.6 N/dm n/D = 1.5828 |
| 20 | | 49.7 N/dm n/D = 1.5595 | Tg = 8.8° C. n/D = 1.5865 |
| 10 | | Tg = −4.9° C. n/D = 1.5595 | Tg = 20.8° C. n/D = 1.5902 |
| 5 | 82.8 N/dm n/D = 1.5022 | 49.4 N/dm n/D = 1.5300 | |

TABLE V-continued

Examples of BPA based PSA formulations including solution polymerized polymer blended with Ferro Santicizer 154 Plasticizer. The refractive index (n/D) at 23° C. is shown for all examples. Peel adhesion strength is shown for PSA formulations, the Tg is shown for heat activated adhesives formulations.

| 0 | 109.36 N/dm | 55.7 N/dm | Tg = 16.5° C. |
|---|---|---|---|
|  | n/D = 1.4991 | n/D = 1.5287 | n/D = 1.5595 |
| 20 | 40 | 60 | 80 |

BPA (wt %) in IOA/AA/BPA (98-x/2/x)

TABLE VI

Examples of BPEA based PSA formulations including solution polymerized polymer blended with Ferro Santicizer 154 Plasticizer. The refractive index (n/D) at 23° C. is shown for all examples. Peel adhesion strength is shown for PSA formulations, the Tg is shown for heat activated adhesives formulations.

| Ferro Santicizer 154 (wt %) | 16 |  |  | 49.7 N/dm |
|---|---|---|---|---|
|  |  |  |  | n/D = 1.5776 |
|  | 10 |  |  | 16.4 N/dm |
|  |  |  |  | n/D = 1.5795 |
|  | 5 |  | 66.6 N/dm | Tg = 3.9° C. |
|  |  |  | n/D = 1.5530 | n/D = 1.5816 |
|  | 0 | 97.5 N/dm | 58.1 N/dm | Tg = 10.2° C. |
|  |  | n/D = 1.5240 | n/D = 1.5525 | n/D = 1.5835 |
|  |  | 40 | 60 | 80 |

BPEA (wt %) in IOA/AA/BPEA (98-x/2/x)

TABLE VII

Examples of BPHA based PSA formulations including solution polymerized polymer blended with Ferro Santicizer 154 Plasticizer. The refractive index (n/D) at 23° C. is shown for all examples. Peel adhesion strength is shown for PSA formulations

| Ferro Santicizer 154 (wt %) | 5 |  |  |  | 43.7 N/dm |
|---|---|---|---|---|---|
|  |  |  |  |  | n/D = 1.5789 |
|  | 0 | 42.4 N/dm | 63.1 N/dm | 79.9 N/dm | 49.4 N/dm |
|  |  | n/D = 1.5134 | n/D = 1.5359 | n/D = 1.5588 | n/D = 1.5806 |
|  |  | 40 | 60 | 80 | 98 |

BPHA (wt %) in IOA/AA/BPHA (98-x/2/x)

TABLE VIII

Examples of BA/AA/BPEA based PSA formulations including solution polymerized polymer blended with Ferro Santicizer 154 Plasticizer. The refractive index (n/D) at 23° C. is shown for all examples. Peel adhesion strength is shown for PSA formulations

| Ferro Santicizer 154 (wt %) | 40 |  |  | 50.9 N/dm |
|---|---|---|---|---|
|  |  |  |  | n/D = 1.5705 |
|  | 30 |  |  | 43.4 N/dm |
|  |  |  |  | n/D = 1.5735 |
|  | 20 | 27.6 N/dm | 25.7 N/dm | 50.9 N/dm |
|  |  | n/D = 1.527 | n/D = 1.5522 | n/D = 1.5764 |
|  | 10 | 39.8 N/dm | 42.3 N/dm |  |
|  |  | n/D = 1.5225 | n/D = 1.5516 |  |
|  | 5 | 47.7 N/dm | 32.5 N/dm |  |
|  |  | n/D = 1.5220 | n/D = 1.5511 |  |
|  | 0 | 54.3 N/dm | 22.5 N/dm |  |
|  |  | n/D = 1.5210 | n/D = 1.5510 |  |
|  |  | 40 | 60 | 80 |

BPEA (wt %) in BA/AA/BPEA (98-x/2/x)

TABLE IX

Haze and luminous transmission of 2 mil PSA films

| Example formula | Santicizer 154 (pbw) | Haze | % Luminous Transmission | | |
|---|---|---|---|---|---|
|  |  |  | 450 nm | 580 nm | 700 nm |
| IOA/AA/BPA | 58/2/40 | 0 | 0.7 | 92.1 | 92.3 | 92.3 |
| IOA/AA/BPEA | 38/2/60 | 5 | 0.9 | 92.1 | 92.5 | 92.4 |
| IOA/AA/BPHA | 38/2/60 | 0 | 0.9 | 92.0 | 92.6 | 92.5 |

The invention claimed is:

1. An adhesive article comprising:

a flexible or inflexible substrate; and a pressure sensitive adhesive coated on the substrate, the pressure sensitive adhesive comprising: a random copolymer having:

a) 10 to 90 parts by weight of monomer units having pendent biphenyl groups;

b) 90 to 10 parts by weight of alkyl (meth)acrylate monomer units;

c) 1 to 15 parts by weight of acid functional monomer units;

d) 0 to 15 parts by weight of polar monomers; and e) 0 to 5 parts by weight of other monomers, wherein the sum of the monomers is 100 parts by weight; and optionally a plasticizer, wherein the monomer units having pendent biphenyl groups are of the formula:

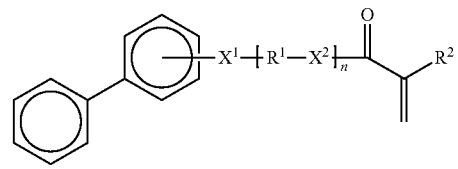

wherein $X^1$ and $X^2$ are each independently —O—, —S—, or —NR$^3$—, where R$^3$ is H or $C_1$-$C_4$ alkyl;

$R^1$ is an alkylene of 1 to 8 carbons optionally containing one or more catenary ether oxygen atoms or pendent hydroxy groups;

n is 0 or 1; and $R^2$ is either H or $CH_3$; such that when n is 0, the biphenyl group comprises 2-substituted biphenyl, and wherein the monomer units having pendent biphenyl groups have as homopolymers a glass transition temperature of 70° C. or less.

2. The adhesive article of claim 1, wherein the substrate comprises a flexible substrate comprising a plastic film.

3. The adhesive article of claim 2, wherein the plastic film comprises a polypropylene film, a polyethylene film, a polyvinyl chloride film, a polyester film, a polycarbonate film, a polymethyl(meth)acrylate film, a cellulose acetate film, a cellulose triacetate film, or an ethyl cellulose film.

4. The adhesive article of claim 1, wherein the substrate comprises an inflexible substrate comprising metal, metallized polymeric film, tin oxide coated glass, tin oxide coated polyester, polymethyl(meth)acrylate plate, polycarbonate plate, glass, or a ceramic sheet.

5. The adhesive article of claim 1, wherein the coated pressure sensitive adhesive has a thickness of from 2-500 micrometers dry thickness.

6. The adhesive article of claim 1, wherein the coated pressure sensitive adhesive has a thickness of from 25-250 micrometers dry thickness.

7. The adhesive article of claim 1, wherein the pressure sensitive adhesive further comprises at least one additive.

8. The adhesive article of claim 7, wherein the additive comprises a UV absorber, a hindered amine light stabilizer, or a combination thereof.

9. The adhesive article of claim 7, wherein the additive comprises a UV absorber, wherein the UV absorber is present in an amount of 1 to 5 weight % based on the total weight of the pressure sensitive adhesive composition.

10. A pressure sensitive adhesive comprising a random copolymer having:
    a) 10 to 90 parts by weight of monomer units having pendent biphenyl groups;
    b) 90 to 10 parts by weight of alkyl (meth)acrylate monomer units;
    c) 1 to 15 parts by weight of acid functional monomer units;
    d) 0 to 15 parts by weight of polar monomers; and
    e) 0 to 5 parts by weight of other monomers,
    wherein the sum of the monomers is 100 parts by weight; and
optionally a plasticizer, wherein the monomer units having pendent biphenyl groups are of the formula:

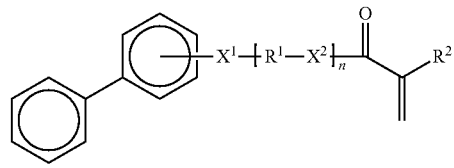

wherein
$X^1$ and $X^2$ are each independently —O—, —S—, or —NR$^3$—, where $R^3$ is H or $C_1$-$C_4$ alkyl;
$R^1$ is an alkylene of 1 to 8 carbons optionally containing one or more catenary ether oxygen atoms or pendent hydroxy groups;
n is 0 or 1; and
$R^2$ is either H or $CH_3$; such that when n is 0, the biphenyl group comprises 2-substituted biphenyl, and wherein the monomer units having pendent biphenyl groups have as homopolymers a glass transition temperature of 70° C. or less;
and further comprising at least one additive.

11. The pressure sensitive adhesive of claim 10, wherein the additive comprises a UV absorber, a hindered amine light stabilizer, or a combination thereof.

12. The pressure sensitive adhesive of claim 10, wherein the additive comprises a UV absorber, wherein the UV absorber is present in an amount of 1 to 5 weight % based on the total weight of the pressure sensitive adhesive composition.

* * * * *

UNITED STATES PATENT AND TRADEMARK OFFICE
CERTIFICATE OF CORRECTION

| | | |
|---|---|---|
| PATENT NO. | : 8,772,425 B2 | Page 1 of 1 |
| APPLICATION NO. | : 13/742022 | |
| DATED | : July 8, 2014 | |
| INVENTOR(S) | : Michael Determan et al. | |

It is certified that error appears in the above-identified patent and that said Letters Patent is hereby corrected as shown below:

On the Title Page

Column 1 – Item (72) (Inventors)
Line 2, Delete "Evaraerts" and insert -- Everaerts --, therefor.

In the Specification

Column 4
Line 28, Delete "Rheinhold," and insert -- Reinhold, --, therefor.

Column 7
Line 38-39, Delete "benezenetetracarboxylic" and insert -- benzenetetracarboxylic --, therefor.

Column 9
Line 39, Delete "phtalates," and insert -- phthalates, --, therefor.
Line 40, Delete "phtalates" and insert -- phthalates --, therefor.

Column 13
Line 46, Delete "Chemcial" and insert -- Chemical --, therefor.
Line 61, Delete "Ceiba" and insert -- Ciba --, therefor.

Column 14
Line 10, Delete "Phillipsburge" and insert -- Phillipsburg --, therefor.
Line 67, Delete "above" and insert -- above. --, therefor.

Column 16
Line 13, Delete "calorimetry" and insert -- Calorimetry --, therefor.

Signed and Sealed this
Seventh Day of April, 2015

Michelle K. Lee
*Director of the United States Patent and Trademark Office*